United States Patent
Komeda et al.

(10) Patent No.: US 8,909,763 B2
(45) Date of Patent: Dec. 9, 2014

(54) COMPUTING-DEVICE MANAGEMENT DEVICE, COMPUTING-DEVICE MANAGEMENT METHOD, AND COMPUTING-DEVICE MANAGEMENT PROGRAM

(75) Inventors: Munehiro Komeda, Tokyo (JP); Hideyasu Nagashima, Kanagawa (JP); Naoki Morimoto, Aichi (JP); Nobuhiro Fujino, Kanagawa (JP)

(73) Assignees: Mitsubishi Heavy Industries, Ltd., Tokyo (JP); Hitachi, Ltd., Tokyo (JP)

( * ) Notice: Subject to any disclaimer, the term of this patent is extended or adjusted under 35 U.S.C. 154(b) by 124 days.

(21) Appl. No.: 13/076,893

(22) Filed: Mar. 31, 2011

(65) Prior Publication Data

US 2012/0254399 A1    Oct. 4, 2012

(51) Int. Cl.
*G06F 15/173* (2006.01)
*G06F 9/50* (2006.01)

(52) U.S. Cl.
CPC .................... *G06F 9/5083* (2013.01)
USPC ........... 709/224; 709/206; 709/204; 709/228; 714/4.1; 714/47; 718/105

(58) Field of Classification Search
CPC ... G06F 9/5083; G06F 9/505; H04L 67/1002; H04L 67/1008; H04L 12/1827; H04L 29/1215; H04L 61/1564
USPC ............. 709/224, 228, 226; 714/4.1; 718/105
See application file for complete search history.

(56) References Cited

U.S. PATENT DOCUMENTS

| | | | |
|---|---|---|---|
| 6,560,717 B1 * | 5/2003 | Scott et al. ...................... | 714/4.1 |
| 2011/0078318 A1 * | 3/2011 | Desai et al. ................... | 709/228 |

FOREIGN PATENT DOCUMENTS

| | | |
|---|---|---|
| JP | 7-302242 | 11/1995 |
| JP | 9-81409 | 3/1997 |
| JP | 2007-299161 | 11/2007 |
| JP | 2008-15950 | 1/2008 |
| JP | 2008-158996 | 7/2008 |
| JP | 2009-123238 | 6/2009 |
| JP | 2009-237859 | 10/2009 |
| WO | 2009/037915 | 3/2009 |

OTHER PUBLICATIONS

Japanese Decision to Grant a Patent dated Dec. 3, 2013 has been received in Japanese Application No. 2009-289805.
Office Action dated Jul. 30, 2013 in corresponding Japanese Application No. 2009-289805, with English translation thereof.

* cited by examiner

*Primary Examiner* — Kyung H Shin
(74) *Attorney, Agent, or Firm* — Wenderoth, Lind & Ponack, L.L.P.

(57) ABSTRACT

A computing-device management device includes a future load prediction unit that calculates a load prediction value based on load information of the computing device informed by the computing device and determines whether the load prediction value exceeds a predetermined threshold value. A software allocation unit detects, as a target computing device to be in an overloaded state in future, the computing device determined by the future load prediction unit to have the load prediction value exceeding the predetermined threshold value and determines which computing device is to be an allocation destination of at least one software component operating in the target computing device based on a CPU load, a used memory volume, and a data communication volume of the computing device. An informing unit informs the target computing device and the allocation-destination computing device of information of the allocated software component.

9 Claims, 6 Drawing Sheets

COMPUTING-DEVICE MANAGEMENT DEVICE, COMPUTING-DEVICE MANAGEMENT METHOD, AND COMPUTING-DEVICE MANAGEMENT PROGRAM

CROSS-REFERENCE TO RELATED APPLICATIONS

This application is based on Japanese Patent Application No. 2009-289805, the contents of which are incorporated herein by reference.

TECHNICAL FIELD

The present invention relates to load prediction and load distribution of a computing-device system installed in a control station of, for example, airplanes.

BACKGROUND ART

Conventionally, a load distribution method of monitoring the load of a computing device and, if the load is increased, causing another computing device to execute the process thereof has been known (for example, see Patent Literature 1) as a method for improving the usability of a computing-device system.

CITATION LIST

Patent Literature

{PTL 1}
Japanese Unexamined Patent Application, Publication No. 2008-15950

SUMMARY OF INVENTION

However, the above described invention of Patent Literature 1 has problems, for example, processes become too complex to carry out the process of load distribution in real-time since the load of application software is monitored on the basis of the information such as the process time, process start time, and process due of the individual application software, and load distribution is carried out on the basis of that.

The present invention has been accomplished in order to solve the above described problem, and it is an object of the present invention to provide a computing-device management device and a computing-device management system capable of easily carrying out load distribution of computing devices.

In order to solve the above described problem, the present invention employs the following solutions.

A first aspect of the present invention is a computing-device management device connected to a plurality of computing devices via an information transmission medium, the computing-device management device having: a future load prediction unit that calculates a load prediction value, which is a value of a future load in each of the computing devices, on the basis of load information of the computing device informed by the computing device and that determines whether the load prediction value exceeds a predetermined threshold value or not; a software allocation unit that detects, as a target computing device to be in an overloaded state in future, the computing device determined by the future load prediction unit to have the load prediction value exceeding the predetermined threshold value and that determines which computing device is to be an allocation destination of at least one software component operating in the target computing device on the basis of a CPU load, a memory used volume, and a data communication volume of the computing device; and an informing unit that informs the target computing device and the allocation-destination computing device of information of the allocated software component.

According to such a configuration, the future load is predicted for each of the computing devices on the basis of the CPU load, the memory used volume, and the data communication volume of the computing device instead of the state of the applications operating on the computing device. Therefore, the future working state of the computing devices can be easily predicted. Furthermore, the software component working in the computing device which is determined to be in the overloaded state in the future can be transferred to another computing device before the computing device becomes the overloaded state; therefore, the computing devices can be prevented from becoming the overloaded state. As a result, the usability of the computing devices can be improved.

The above described computing-device management device may be configured so that, when one software component is operating in an active state in one of the computing devices, another software component that is the same as the one software component is operated in a standby state in at least another one of the computing devices; and the software allocation unit determines which computing device is to be the allocation destination of the software component to be operated in the active state and which computing device is to be the allocation destination of the software component to be operated in the standby state.

In this manner, in the allocation of the software component, the computing device in which the software component to be operated in the active state and the computing device in which the software component is to be operated in the standby state are determined. Therefore, the software component can be always caused to be duplex. As a result, the usability of the computing-device system can be further improved.

The above described computing-device management device may be configured so that the software allocation unit calculates a transfer score for each of the software component on the basis of: loads of a CPU load, a memory load, and a data communication volume of the software component operating on the target computing device; predetermined weight factors for the CPU load, the memory load, and the data communication volume; and a transfer priority set for each of the software component; and the software allocation unit prioritizes allocation of the software component having a large score as the transfer score to the other computing device.

In this manner, the transfer score which is the index of the load applied to the computing device is calculated about each software component operating on the computing device determined to be in the overloaded state, and the software component having a higher transfer score is prioritized for selection of the allocation-destination computing device. As a result, transfer of the software component having a low degree of real-time processing demand and the software component having a large load to another computing device can be prioritized, the influence of process interruption of the computing device caused along with transfer of the software component can be reduced, and the load of the computing device which is determined to be in the overloaded state in the future can be efficiently reduced.

The above described computing-device management device may be configured so that the future load prediction unit calculates the load prediction value by using a mathematical-equation model using past load information of the computing device as one of parameters.

In this manner, the future load to be applied to the computing devices can be predicted on the basis of the past load information of the computing devices. Therefore, future load prediction further close to reality can be carried out, and the precision of the future load prediction can be improved. The above described mathematical model is, for example, Lagrange interpolation polynomials.

The above described computing-device management device may be configured so that the future load prediction unit calculates the load prediction value of each of the computing devices on the basis of the CPU load, the memory used volume, and the data communication volume of the computing device.

In this manner, the future loads applied to the computing devices are predicted on the basis of the CPU loads, the memory loads, and the data communication volumes of the computing devices. Therefore, the working state of the computing devices can be understood in detail, and the precision of the load distribution can be improved.

A second aspect of the present invention is a computing-device management device connected to a plurality of computing devices via an information transmission medium, the computing-device management device having: a fault monitoring unit that detects the computing device in which a fault has been occurring on the basis of fault occurrence information informed by the computing device; a software allocation unit that determines which computing device is to be an allocation destination of a software component operated on the fault-occurrence detected computing device on the basis of a CPU load, a memory used volume, and a data communication volume of the computing device; and an informing unit that informs the allocation-destination computing device of information of the allocated software component.

According to such a configuration, the occurrence of faults in the computing devices is monitored on the basis of the fault information informed by the computing devices; and, if the computing device in which a fault is occurring is detected, the allocation of the software components operated in the fault-occurred computing device is carried out. Therefore, switching of the allocation of the software components can be promptly carried out. As a result, the usability of the computing-device system can be improved.

The computing-device management device according to the first aspect or the second aspect may be configured so that the software allocation unit calculates a weighted future load for each of the computing devices on the basis of load prediction values respectively calculated for the CPU load, the memory load, and the data communication volume of the computing device and predetermined weight factors for the CPU load, the memory load, and the data communication volume; and allocation of the software component to the computing device having a small load as the weight future load is prioritized.

In this manner, the weighted future load is calculated for each of the computing devices on the basis of the load prediction values calculated respectively for the CPU load, the memory load, and the data communication volume of each of the computing devices and the predetermined weight factors for the CPU load, the memory load, and the data communication volume. The weighted future load is an index indicating that the smaller the value, the smaller the future load in the computing device. Therefore, the software component can be executed by the computing device having a small future load by prioritizing selection of the computing device having a small load as the weighted future load as the computing device of the allocation destination of the software component. As a result, load distribution can be efficiently carried out, and the usability of the computing-device system can be improved.

A third aspect of the present invention is a computing-device management system having a plurality of computing devices and the computing-device management device according to the first aspect or the second aspect.

The above described computing-device management system may be configured so that the computing-device management device is duplex.

Since the computing-device management device is duplex, even when the computing-device management device operating in the active state fails, the second computing-device management device is operated. Therefore, the computing-device management system per se can be continuously operated.

A fourth aspect of the present invention is a computing-device management method including: a step of calculating a load prediction value, which is a value of a future load in each of computing devices, on the basis of load information of the computing device informed by the computing device and determining whether the load prediction value exceeds a predetermined threshold value or not; a step of detecting, as a target computing device to be in an overloaded state in future, the computing device determined to have the load prediction value exceeding the predetermined threshold value by the step of determining whether the load prediction value exceeds the predetermined threshold value or not and determining which computing device is to be an allocation destination of at least one software component operating in the target computing device on the basis of a CPU load, a memory used volume, and a data communication volume of the computing device; and a step of informing the target computing device and the allocation-destination computing device of information of the allocated software component.

A fifth aspect of the present invention is a computing-device management program for causing a computer to execute: a process of calculating a load prediction value, which is a value of a future load in each of computing devices, on the basis of load information of the computing device informed by the computing device and determining whether the load prediction value exceeds a predetermined threshold value or not; a process of detecting, as a target computing device to be in an overloaded state in future, the computing device determined to have the load prediction value exceeding the predetermined threshold value by the process of determining whether the load prediction value exceeds the predetermined threshold value or not and determining which computing device is to be an allocation destination of at least one software component operating in the target computing device on the basis of a CPU load, a memory used volume, and a data communication volume of the computing device; and a process of informing the target computing device and the allocation-destination computing device of information of the allocated software component.

A sixth aspect of the present invention is a computing-device management method including: a step of detecting the computing device in which a fault has been occurring on the basis of fault occurrence information informed by the computing device; a step of determining which computing device is to be an allocation destination of a software component operated on the fault-occurrence detected computing device on the basis of a CPU load, a memory used volume, and a data communication volume of the computing device; and a step of informing the allocation-destination computing device of information of the allocated software component.

A seventh aspect of the present invention is a computing-device management program for causing a computer to execute: a process of detecting the computing device in which a fault has been occurring on the basis of fault occurrence information informed by the computing device; a process of determining which computing device is to be an allocation destination of a software component operated on the fault-occurrence detected computing device on the basis of a CPU load, a memory used volume, and a data communication volume of the computing device; and a process of informing the allocation-destination computing device of information of the allocated software component.

According to the present invention, load distribution of computing devices can be easily carried out.

DESCRIPTION OF INVENTION

Hereinafter, embodiments of computing-device management devices of the present invention will be explained in detail sequentially from [First Embodiment] to [Second Embodiment] with reference to drawings.

First Embodiment

Figure 1:
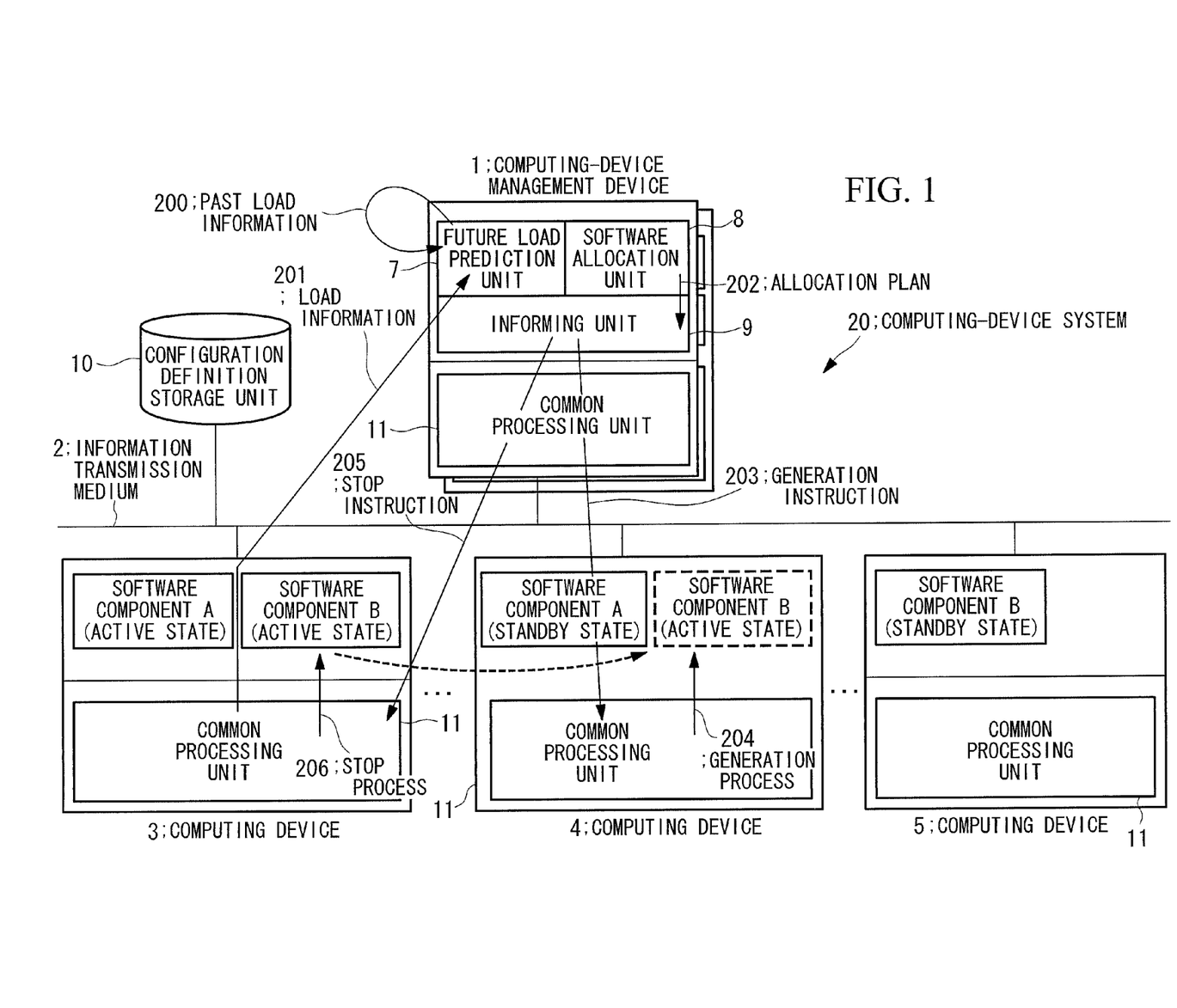
FIG. 1 is a functional block diagram showing an example of the configuration of a computing-device system according to a first embodiment of the present invention.

FIG. 1 is a functional block diagram showing a brief configuration of a computing-device management system according to the present embodiment.

As shown in FIG. 1, a computing-device system 20 according to the present embodiment has a plurality of computing devices 3, 4, and 5 and a computing-device management device 1. The computing devices 3, 4, and 5 and the computing-device management device 1 are mutually connected via an information transmission medium 2 and configured to be able to carry out bidirectional communication therebetween.

In the computing-device system 20, common software components are installed in a plurality of computing devices. When one software component is operating in an active state in one computing device, another software component that is the same as the one software component is always operating in a standby state in at least one other computing device. The active state is a state in which the software component is working. On the other hand, the standby state is a preparation state in which the software component is normally waiting as a backup component in order to promptly continue operation in place of the active state when the component that is in the active state becomes unusable or is stopped.

Furthermore, the computing device, in which a software component is operating in the active state, periodically informs the computing device, in which the same software component is operating in the standby state, of the information retained by the software component that is operating in the active state. Therefore, the information retained among the software component that is operating in the active state and the software component that is operating in the standby state are the same. When the same software component is installed in the plurality of computing devices and caused to operate in the active state and the standby state in this manner, redundancy can be ensured, and the switching of the computing device in which the software component is to be operated in the active state can be promptly carried out.

As shown in FIG. 1, the present embodiment presupposes the state in which: both a software component A and a software component B are operating in the active state in the computing device 3, the software component A is operating in the standby state in the computing device 4, and the software component B is operating in the standby state in the computing device 5.

Each of the computing devices 3, 4, and 5 has a common processing unit 11. The common processing unit 11 periodically monitors the CPU load, the memory used volume, and the data communication volume of the computing device, in which the unit is provided, and informs the computing-device management device 1 of load information 201 which is the results of the monitoring.

Furthermore, when the common processing unit 11 is informed of a stop instruction 205 by the computing-device management device 1, with respect to a corresponding software component operating on the computing device thereof, the common processing unit 11 carries out a process of stopping the software component in accordance with the instruction. When the common processing unit 11 is informed of a generation instruction 203 by the computing-device management device 1, the common processing unit 11 carries out a process of generating a software component in accordance with the instruction.

The computing-device management device 1 has: a future load prediction unit 7, a software allocation unit 8, and an informing unit 9.

The future load prediction unit 7 calculates load prediction values, which are the values of the future loads of the computing devices 3, 4, and 5, on the basis of load information 201 of the computing devices informed by the computing devices 3, 4, and 5; and the future load prediction unit 7 determines whether the load prediction values exceed predetermined threshold values or not. If there is any computing device having the load prediction value exceeding the predetermined threshold value, it is determined that the computing device will be in an overloaded state in the future, and the information of the computing device is output to the software allocation unit 8.

Specifically, the load prediction values are calculated by predetermined arithmetic equations by using the load information 201 informed by the computing devices 3, 4, and 5 and past load information 200 which is the load information 201 the future load prediction unit 7 is previously informed of and saved by the future load prediction unit 7. The arithmetic equations are, for example, interpolation polynomials.

More specifically, the future load prediction unit 7 calculates the load prediction values by using Lagrange interpolation polynomials. For example, a future load value L (t) at future time t can be obtained by an equation (1) and an equation (2) of n-th order Lagrange interpolation polynomials, which are publicly known mathematical equations, wherein the time of the future for which the future load is to be calculated is t, a load measured value of the past is $l_k$, load measured time of the past is $t_k$, the number of order is n.

{Math 1}

$$L(t) = \sum_{k=0}^{n} L_k(t) l_k \qquad (1)$$

The equation (1) is provided on the condition that the equation (2) is satisfied.

$$L_k(t) = \prod_{j=0}^{n(j \neq k)} \frac{t - t_j}{t_k - t_j} \qquad (2)$$

Figure 2:
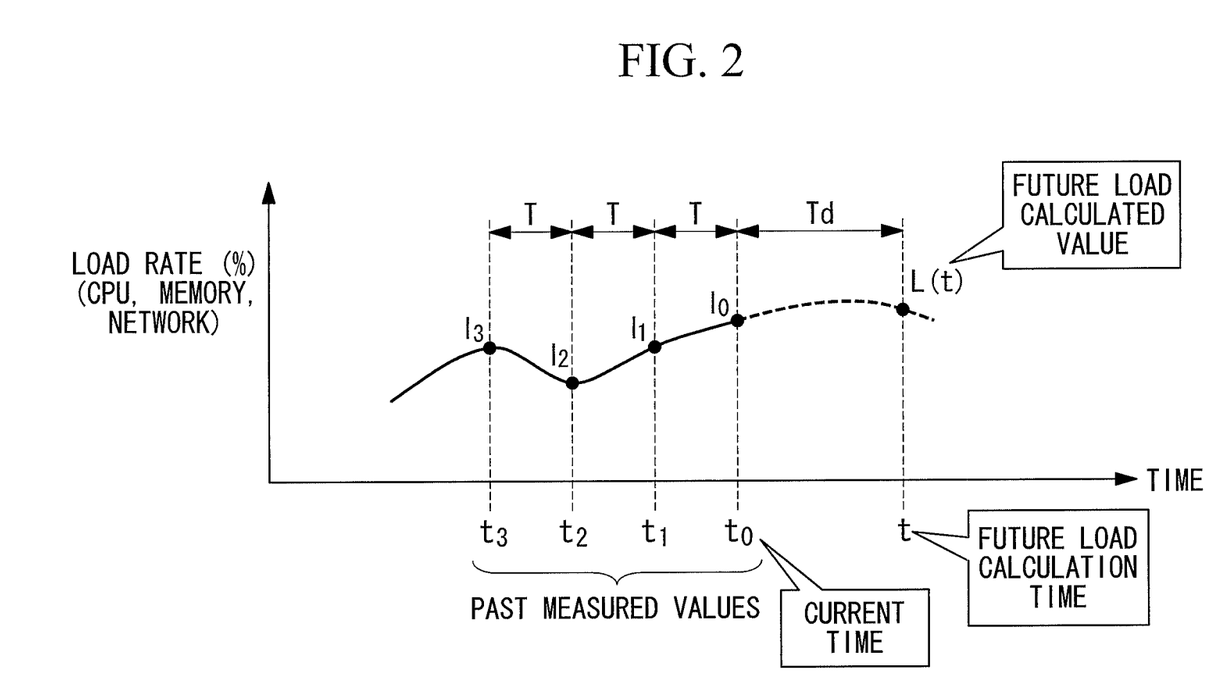
FIG. 2 is a graph for explaining a method of calculating a future load by Lagrange interpolation polynomials.

FIG. 2 is a graph in which a horizontal axis represents time and a vertical axis represents a load rate (percent is used as the unit thereof). The load rate refers to the rate (percent is used as the unit thereof) of the CPU load, the memory used volume, or the data communication volume actually monitored in each computing device when the state in which the CPU load, the memory used volume, or the data communication volume of the computing device is fully used is assumed to be 100 percent.

For example, when the order is 3 in the case in which the load rate measured values of the past and the load rate measured value of the current time are obtained, the future load rate L (t) at future load calculation time t is obtained by a below equation (3) on the basis of the load rate measured values of the last time, the penultimate time, and the antepenultimate time. In the equation (3), the future time at which the future load is to be calculated is t, the load rate measurement time of this time to the third last time is $t_0$ to $t_3$, the load rate measured values of this time to the third last time is $l_0$ to $l_3$, a load measurement cycle is T, and the difference between the future load calculation time and the current time is Td. The cycle T and the difference Td are defined in a configuration definition storage unit 10 and are the values which can be arbitrarily changed.

{Math 2}

$$L(t) = \frac{(t-t_1)(t-t_2)(t-t_3)}{(t_0-t_1)(t_0-t_2)(t_0-t_3)} l_0 + \frac{(t-t_0)(t-t_2)(t-t_3)}{(t_1-t_0)(t_1-t_2)(t_1-t_3)} l_1 + \frac{(t-t_0)(t-t_1)(t-t_3)}{(t_2-t_0)(t_2-t_1)(t_2-t_3)} l_2 + \frac{(t-t_0)(t-t_1)(t-t_2)}{(t_3-t_0)(t_3-t_1)(t_3-t_2)} l_3 \qquad (3)$$

For example, when the load prediction value L (t)' of the computing device 3 exceeds the predetermined threshold value, the computing device 3 is predicted to be in the overloaded state in the future, and the result is output to the software allocation unit 8.

In this manner, the future load prediction unit 7 specifies the computing device which will be overloaded in the future. Therefore, the computing devices which will be likely overloaded can be detected before the computing devices are overloaded. The future load is predicted according to the CPU load, the memory used volume, and the data communication volume without taking applications into consideration; therefore, the future loads of the computing devices can be predicted with the processing volume smaller than that of the case in which the future loads are predicted in consideration of the applications.

The software allocation unit 8 calculates a transfer score for each of the software components in the computing device, which is determined to be in the overloaded state in the future, on the basis of: the load values of CPU load, memory load, and data communication volume of each software component; predetermined weighting factors for the CPU load, the memory load, and the data communication volume; and a transfer priority set for each of the software components. The computing device to serve as an allocation destination is determined for the software components in the descending order of the transfer score, and the software allocation unit 8 outputs the result to the informing unit 9.

Figure 3:
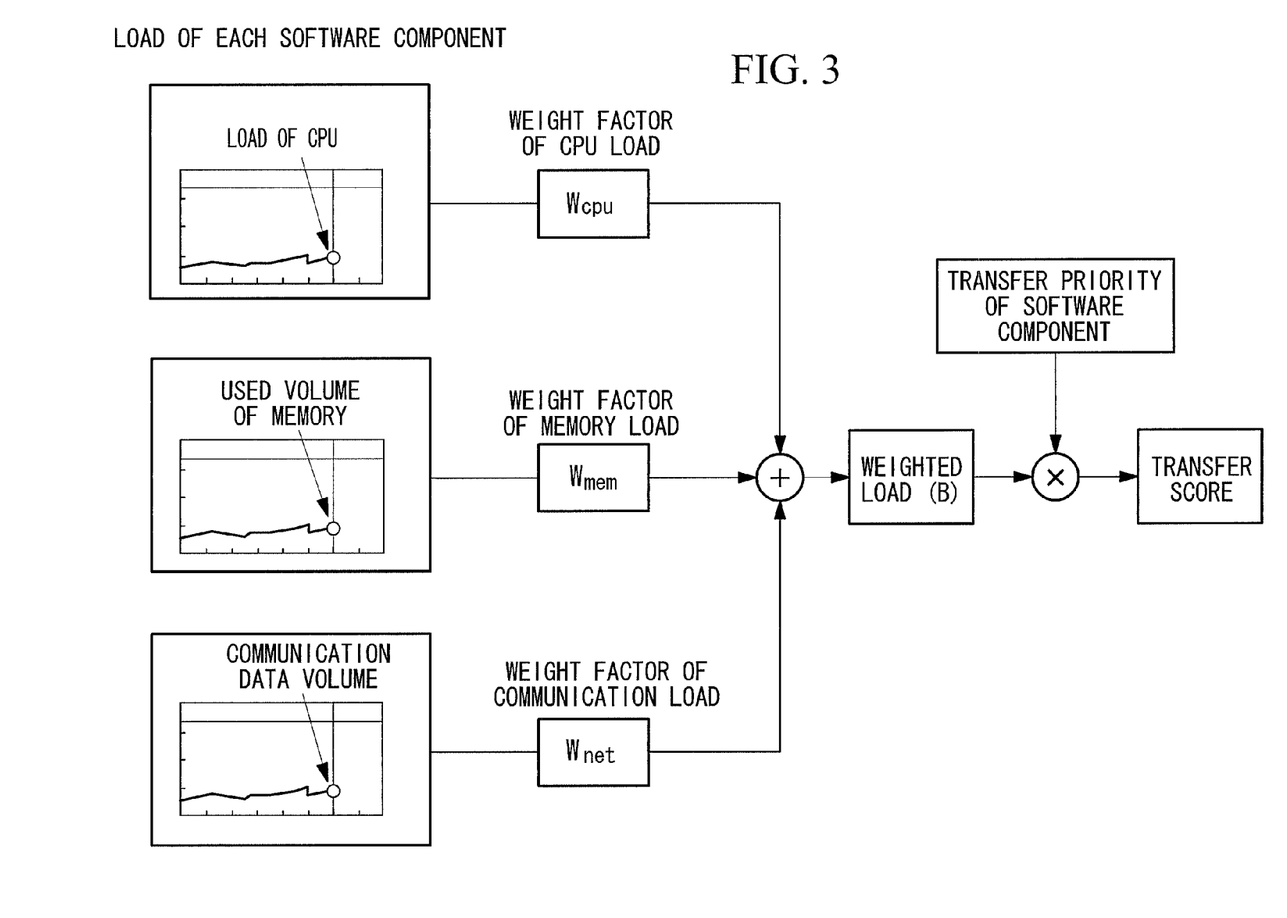
FIG. 3 is a diagram for explaining a method of selecting a software component.

Specifically, as shown in FIG. 3, the current loads of the CPU load, the memory used volume, and the data communication volume are calculated for each of the software components of the computing device 3; the CPU load is integrated with a predetermined weight factor of the CPU load, the current memory used volume is integrated with a predetermined weight factor of the memory used volume, and the current data communication volume is integrated with a predetermined weight factor of the data communication volume; and the sum of the integration results is calculated as the weighted load B of the software component. Subsequently, the weighted load B and a predetermined transfer priority of the software component are integrated to calculate a transfer score. The transfer score is an index of the load applied to the computing device by the software component. It can be assumed that the larger the transfer score, the larger the load applied to the computing device by the software component.

Subsequently, the computing device to which the software component is to be transferred is determined. Specifically, the computing device which is to operate the software component is selected on the basis of the future load state of the computing devices.

Figure 4:
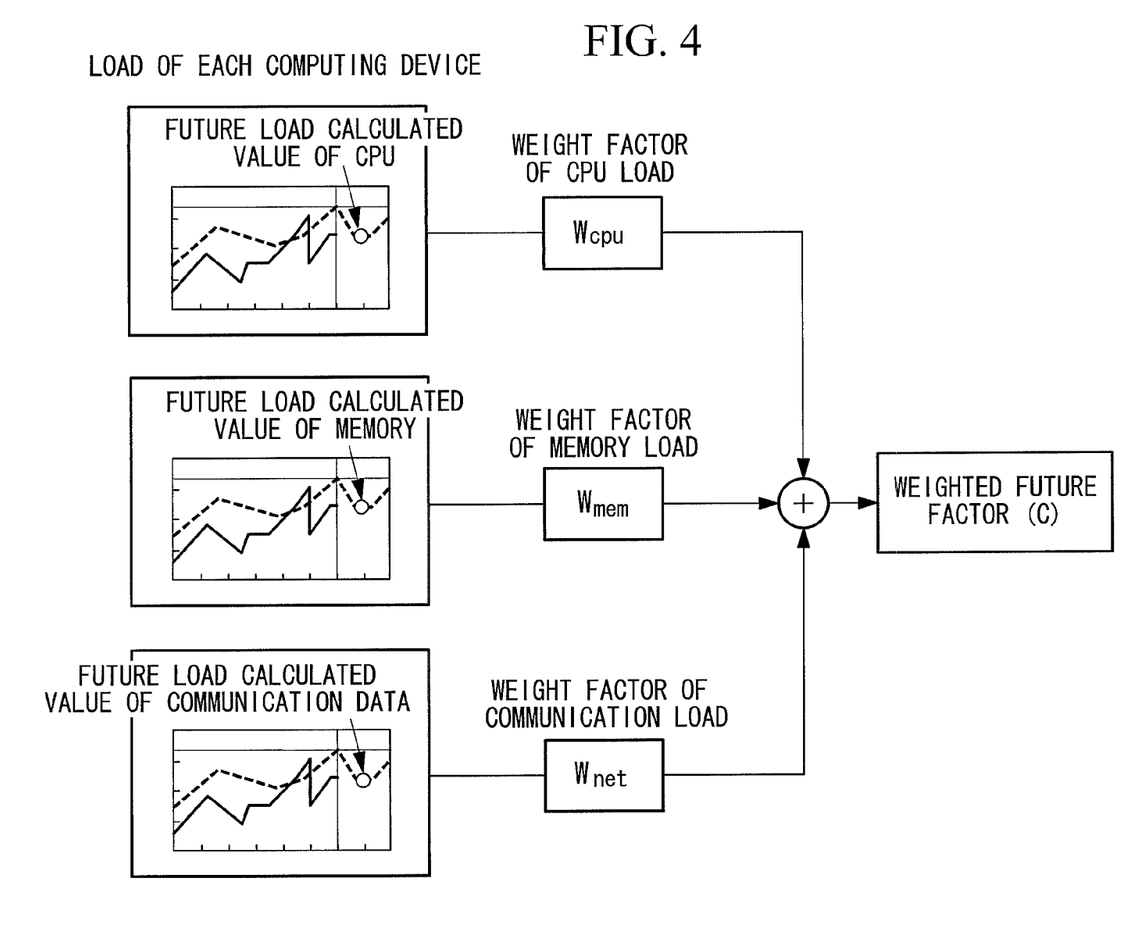
FIG. 4 is a diagram for explaining a method of selecting a computing device in which the software component is to be operated.

More specifically, as shown in FIG. 4, the load prediction values of each of the computing devices calculated by the future load prediction unit 7 and the weight factor of the CPU load, the weight factor of the memory used volume, and the weight factor of the data communication volume stored in the configuration definition storage unit 10 are integrated to calculate weighted future load C. The computing device for operating the component is selected in accordance with the value of the weighted future load C. The weighted future load C is an index representing the magnitude of the future load of the computing device; and the load C means that the smaller the value thereof, the smaller the predicted future load. Therefore, the software component can be efficiently allocated to the computing device having a small load by selecting the computing device having a small value of the weighted future load C as the computing device which is to operate the software component.

For example, the future load prediction unit 7 predicts that the computing device 3 will be overloaded in the future, and the software component B operated in the active state in the computing device 3 is to be allocated to another computing device. In this case, the software allocation unit 8 obtains the weighted future load of each of the computing devices and, on the basis of the weighted future load, selects the computing device which is to operate the software component B, which is operating in the active state in the computing device 3. As a result, the software component B normally operates, and the computing device capable of ensuring resources can be selected as the computing device serving as the allocation destination. In this process, it is preferred that the computing device determined to be in the overloaded state in the future and the computing device in which the software component in the standby state for which redundancy is not ensured is operating be excluded from the selection of determining the computing device to operate the component. Therefore, in the present embodiment, the computing device 4 is selected as the computing device to operate the software component B in the active state.

The informing unit 9 informs the computing device, which is determined to be in the overloaded state in the future, and the computing device, which is the allocation destination of the software component, of the information about the allocation of the software component. For example, the informing unit 9 outputs the stop instruction 205 to the computing device 3, in which the software component B is operating in the active state, and outputs the generation instruction 203 to the computing device 4, in which the software component B is to be newly operated in the active state.

Information such as the initial layout of the software components, the priorities of the software components, and the maximum allowable load of computing device resources is stored in the configuration definition storage unit 10 in advance. Specifically, the information such as: the initial layout of the software components representing the operating states (the active state and the standby state) of the software components in the computing devices 3, 4, and 5; the priorities for transferring the software components; and the maximum allowable loads of the CPU loads applied to the computing devices, the memory used volumes, and the data communication volumes is stored in advance.

Next, working of the computing-device management device according to the present embodiment will be explained. Herein, for convenience of explanation, the working will be explained on the presupposition that: the software component A and the software component B are operating in the active state in the computing device 3, the software component A is operating in the standby state in the computing device 4, and the software component B is operating in the standby state in the computing device 5.

First, the common processing unit 11 of the computing device 3 periodically monitors the CPU load, the memory volume, and the data communication volume of the computing device of its own, and the monitoring results are output to the computing-device management device 1 as the load information 201.

Similarly, the monitoring results of the computing devices 4 and 5 are output to the computing-device management device 1 as the load information 201 by the common processing units 11 of the computing devices 4 and 5. The past load information 200 including the CPU loads, memory used volumes, and data communication volumes of the past retained by the future load prediction unit 7 of the computing-device management device 1 is read. In accordance with the past load information 200 and the load information 201 informed by the computing devices 3, 4, and 5, the prediction load values respectively about the CPU load, memory used volume, and data communication volume are calculated for each of the computing devices. The calculated prediction load values are compared with predetermined threshold values. When the prediction load values are larger than the predetermined threshold values as a result of the comparison, the information of this computing device is output to the software allocation unit 8. For example, when the prediction load values of the computing device 3 are larger than the threshold values, the information of the computing device 3 is output to the software allocation unit 8.

In the software allocation unit 8, the software component to be transferred is selected from among the software components A and B operating in the computing device 3, which is determined to be in the overloaded state in the future by the future load prediction unit 7. When the software component B is selected as a result, the allocation-destination computing device of the software component B is subsequently selected. As a result, the computing device 4 is selected as the computing device in which the software component B is to be operated in the active state. The information about the new allocation of the software component is output to the informing unit 9 as an allocation plan 202. As a result, the computing device 4 is informed of the generation instruction 203 about the software component B, and the computing device 3, in which the software component B has been operated in the active state, is informed of the stop instruction 205.

In the common processing unit 11 of the computing device 4, a generation process 204 of generating the software component B in the active state is executed on the basis of the generation instruction 203 obtained from the informing unit 9. In the common processing unit 11 of the computing device 3, a stop process 206 of stopping a process is executed with respect to the software component B, which is in the active state, on the basis of the stop instruction 205 obtained from the informing unit 9. When the above described processes are executed, the software component B in the computing device 3 is stopped, and the software component B of the computing device 4 is operated in the active state.

In the above described embodiment, the processes carried out by hardware serving as the computing-device management device are presupposed. However, the embodiment is not necessarily limited to such a configuration. For example, a configuration in which the processes are carried out separately by software can be also implemented. In that case, the computing-device management device has a CPU, a main storage device such as a RAM, and a computer-readable recording medium in which a program for realizing all or part of the above described processes is recorded. The processes similar to those of the above described computing-device management device are realized when the CPU reads the program recorded in the storage medium and executes information processing/computing processes.

Herein, the computer-readable recording medium refers to, for example, a magnetic disk, magnetic optical disk, CD-ROM, DVD-ROM, or a semiconductor memory. The computer program may be delivered to a computer by a communication line so that the computer received the delivery executes the program.

Hereinafter, a process procedure of a computing-device management method realized when the computing-device management program is executed by the CPU will be explained with reference to FIG. 5.

Figure 5:
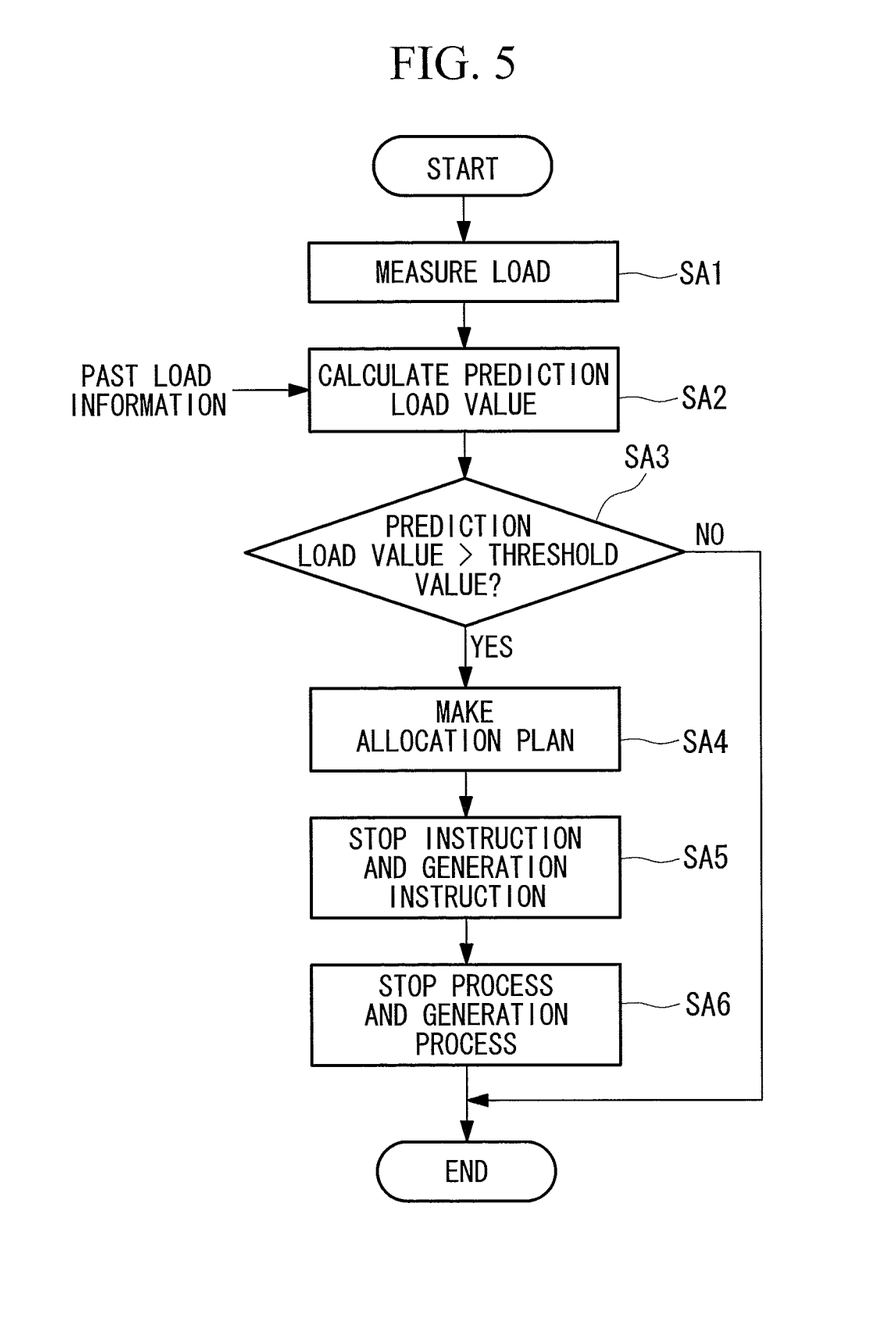
FIG. 5 is a diagram showing a flow chart of a computing-device management method according to the first embodiment of the present invention.

First, each of the computing devices monitors the load information of the CPU load, the memory used volume, and the data communication volume of its own computing device (step SA1 of FIG. 5). Next, future load values are predicted from the monitored load information and past load information (step SA2). The predicted load values are compared with the threshold values (step SA3). When the predicted load value exceeds the threshold value, a plan about allocation of software components is determined (step SA4). On the basis of the determined plan about the allocation, the computing devices serving as processing targets are informed of instructions of processes (step SA5). The processes corresponding to the substances of the instructions informed in step SA5 are carried out, and the present process is terminated (step SA6).

As described above, according to the computing-device management device and the computing-device management system according to the present embodiment, the load information which is the resource information of the computing devices including the CPU loads, the memory used volumes, and the data communication volumes of the computing devices is monitored, and the future load thereof is predicted in accordance with the current load information and the past load information; as a result, the computing device which will be in the overloaded state can be easily predicted, and allocation of the software component, which is operating in the computing device predicted to be in the overloaded state, can be changed to the computing device having allowance in the computing device resources thereof. Thus, the software component can be transferred, and the loads applied to the computing devices can be distributed before problems of the calculation system caused by the overloaded state occur. Therefore, usability and reliability as the computing-device system can be improved.

Moreover, since the future loads are predicted in accordance with the CPU load, the memory used volume, and the data communication volume without taking applications into consideration, the processing volume can be reduced compared with the case in which the future loads are predicted in consideration of the applications.

Furthermore, the same software components are installed in the plurality of computing devices and operated in the active state and standby state; therefore, redundancy is always ensured, and switching of the computing devices which are to operate the components in the active state can be promptly carried out.

In the present embodiment, the order of the polynomials is 3 upon calculation of the load prediction value; however, the order is not limited thereto. For example, the load rate measured values of this time to the fourth last time may be used as the parameters for calculating the future load with the order of the polynomials of 4.

In the process of calculating the transfer score from the load values of the CPU load, the memory load, and the data communication volume of each of the software components, the load prediction values of the CPU load, the memory load, and the data communication volume may be calculated and used instead of the load values of the CPU load, the memory load, and the data communication volume.

Second Embodiment

The present embodiment is different from the above described first embodiment in the point that the computing-device management system monitors fault occurrence of the computing devices and the allocation of the software components is changed in accordance with occurred faults. Hereinafter, different points of the computing-device management system according to the present embodiment will be mainly explained by using FIG. 6, wherein the explanation of the points common to the first embodiment will be omitted.

Figure 6:
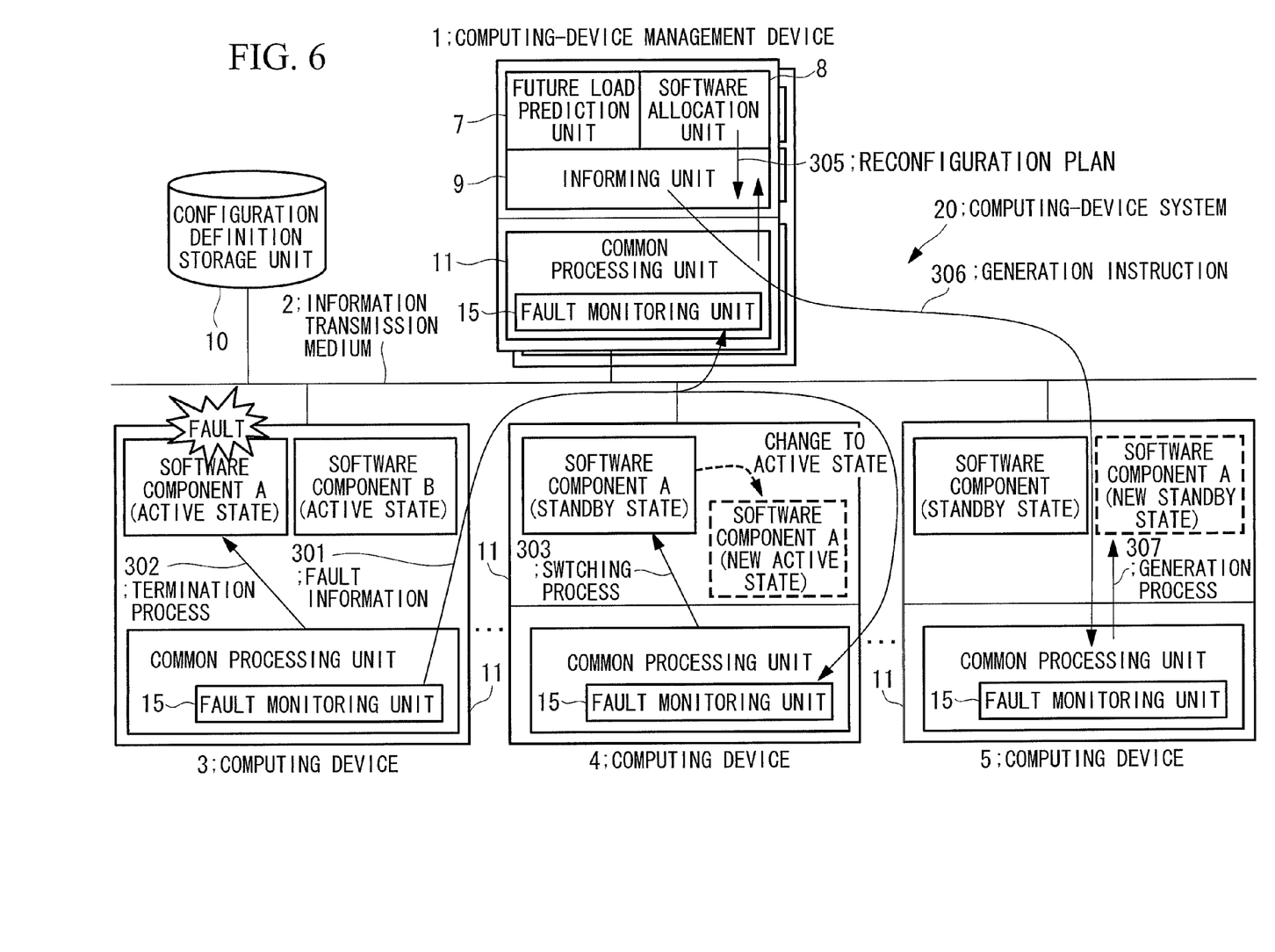
FIG. 6 is a functional block diagram showing an example of the configuration of a computing-device system according to a second embodiment of the present invention.

As shown in FIG. 6, the present embodiment presupposes that: the software component A and the software component B are both operated in the active state in the computing device 3, the software component A is operated in the standby state in the computing device 4, and the software component B is operated in the standby state in the computing device 5. Each of the computing devices 3, 4, and 5 has a fault monitoring unit 15, which detects occurrence of faults.

For example, when the fault monitoring unit 15 of the computing device 3 detects fault occurrence in the software component A of the computing device 3, the fault monitoring unit 15 informs the computing-device management device 1 and the other computing devices of fault information 301. Among the computing devices 3, 4, and 5, which obtained the fault information 301, the computing device 4 in which the software component A operated in the fault-occurred computing device is operated in the standby state executes a switching process 303 of switching the corresponding software component A of its own from the standby state to the active state. As a result, the corresponding software component A is operated in the active state.

When the computing-device management device 1 obtains the fault information 301, the computing-device management device 1 selects the allocation-destination computing device in which the software component A operated in the fault-occurred computing device is to be newly operated in the standby state in order to ensure redundancy. The method described in the above described first embodiment can be employed as a selection method thereof. Upon the selection, it is preferred that the computing device determined to be in the overloaded state in the future, the computing device in which the software component A in the active state for which redundancy cannot be ensured is operating, and the computing device in which hardware may have a fault and the fault of the software component A occurred be excluded from the selection of determining the computing device which is to operate the component. In the present embodiment, the computing device 5 is selected. The computing-device management device 1 newly generates the software component A for the selected computing device 5 and outputs a generation instruction 306 for operating the component in the standby state. The computing device 5, which has received the generation instruction 306, executes a generation process 307 for operating the corresponding software component A in the standby state. The computing device 3 executes a termination process 302 of terminating the fault-occurred software component A.

In this manner, according to the computing-device management system according to the present embodiment, when occurrence of a fault is detected, the computing device in which the software component operated in the fault-occurred computing device is operated in the standby state promptly switches the corresponding software component from the standby state to the active state. As a result, even when the fault occurs, switching of the software component is promptly carried out; therefore, the process thereof can be continuously carried out. Therefore, usability and reliability of the computing-device system can be improved.

REFERENCE SIGNS LIST

1 COMPUTING-DEVICE MANAGEMENT DEVICE
2 INFORMATION TRANSMISSION MEDIUM
3 COMPUTING DEVICE
4 COMPUTING DEVICE
5 COMPUTING DEVICE
7 FUTURE LOAD PREDICTION UNIT
8 SOFTWARE ALLOCATION UNIT
9 INFORMING UNIT
10 CONFIGURATION DEFINITION STORAGE UNIT
11 COMMON PROCESSING UNIT
15 FAULT MONITORING UNIT
201 LOAD INFORMATION
202 ALLOCATION PLAN
203 GENERATION INSTRUCTION
204 GENERATION PROCESS
205 STOP INSTRUCTION
206 STOP PROCESS
301 FAULT INFORMATION
302 TERMINATION PROCESS
303 SWITCHING PROCESS
306 GENERATION INSTRUCTION
307 GENERATION PROCESS

The invention claimed is:

1. A computing-device management device connected to a plurality of computing devices via an information transmission medium, the computing-device management device comprising:
   a computing-device management processor; and
   a non-transitory memory that stores a program, which when executed by the computing-device management processor causes the computing-device management device to operate as:
   a future load prediction unit that calculates a load prediction value, which is a value of a future load in each of the computing devices, based on load information of a computing device informed by the computing device and that determines whether the load prediction value exceeds a predetermined threshold value;
   a software allocation unit that detects, a computing device as a target computing device that is to be in an overloaded state at a future time, the target computing device determined by the future load prediction unit to have the load prediction value exceeding the predetermined threshold value, and that determines which computing device is to be an allocation-destination computing device for operating of at least one software component operating in the target computing device based on a CPU load, a used memory volume, and a data communication volume of the computing device; and
   an informing unit that informs the target computing device and the allocation-destination computing device of information of the allocated software component, based on the detection of the overload state of the target computing device and the determination of the allocation-destination computer device by the software allocation unit, wherein
   the software allocation unit calculates a transfer score for each of the software components based on:
   1) a CPU load, a memory load, and a data communication volume of the software component operating on the target computing device; 2) predetermined weight factors for the CPU load, the memory load, and the data communication volume; and 3) a transfer priority set for each of the software components; and
   the software allocation unit prioritizes allocation of a software component having a large score as the transfer score to another computing device.

2. The computing-device management device according to claim 1, wherein,
   when one software component is operating in an active state in one of the computing devices, another software component that is the same as the one software component is operated in a standby state in at least another one of the computing devices; and
   the software allocation unit determines which computing device is to be the allocation destination of the software component to be operated in the active state and which computing device is to be the allocation destination of the software component to be operated in the standby state.

3. The computing-device management device according to claim 1, wherein
   the future load prediction unit calculates the load prediction value by using a mathematical-equation model using past load information of the computing device as one of parameters.

4. The computing-device management device according to claim 1, wherein
   the future load prediction unit calculates the load prediction value of each of the computing devices based on the CPU load, the memory used volume, and the data communication volume of the computing device.

5. The computing-device management device according to claim 1, wherein
   the software allocation unit calculates a weighted future load for each of the computing devices based on load prediction values respectively calculated for the CPU load, the memory load, and the data communication volume of the computing device and predetermined weight factors for the CPU load, the memory load, and the data communication, and wherein
   allocation of the software component to the computing device is determined to be a small load as the weighted future loads are prioritized.

6. A computing-device management system, comprising:
   a plurality of computing devices; and
   a computing-device management device connected to the plurality of computing devices via an information transmission medium, the computing-device management device including:
   a computing-device management processor; and
   a non-transitory memory that stores a program, which when executed by the computing-device management processor causes the computing-device management device to operate as:
   a future load prediction unit that calculates a load prediction value, which is a value of a future load in each of the computing devices, based on load information of a computing device informed by the computing device and that determines whether the load prediction value exceeds a predetermined threshold value;
   software allocation unit that detects, a computing device as a target computing device that is to be in an overloaded state at a future time, the target computing device determined by the future load prediction unit to have the load prediction value exceeding the predetermined threshold value, and that determines which computing device is to be an allocation-destination computing device for operating of at least one software component operating in the target computing device based on a CPU load, a used memory volume, and a data communication volume of the computing device; and
   an informing unit that informs the target computing device and the allocation-destination computing device of information of the allocated software component, based on the detection of the overload state of the target computing device and the determination of the allocation-destination computer device by the software allocation unit, wherein
   the software allocation unit calculates a transfer score for each of the software components based on:
   1) a CPU load, a memory load, and a data communication volume of the software component operating on the target computing device; 2) predetermined weight factors for the CPU load, the memory load, and the data communication volume; and 3) a transfer priority set for each of the software components; and
   the software allocation unit prioritizes allocation of a software component having a large score as the transfer score to another computing device.

7. The computing-device management system according to claim 6, wherein the computing-device management device is duplex.

8. A computing-device management method, comprising:
calculating a load prediction value, which is a value of a future load in each computing device among computing devices, based on load information of a computing device informed by the computing device and determining whether the load prediction value exceeds a predetermined threshold value;

detecting, a computing device as a target computing device that is to be in an overloaded state at a future time, the target computing device determined to have the load prediction value exceeding the predetermined threshold value by determining whether the load prediction value exceeds the predetermined threshold value, and determining which computing device is to be an allocation-destination computing device for operating of at least one software component operating in the target computing device based on a CPU load, a used memory volume, and a data communication volume of the computing device;

informing the target computing device and the allocation-destination computing device of information of the allocated software component, based on the detection of the overload state of the target computing device and the determination of the allocation-destination computer device;

calculating a transfer score for each of the software components based on:

1) a CPU load, a memory load, and a data communication volume for the software component operating on the target computing device; 2) predetermined weight factors for the CPU load, the memory load, and the data communication volume; and 3) a transfer priority set for each of the software components; and prioritizing allocation of a software component having a large score as the transfer score to another computing device.

9. A non-transitory computer-readable recording medium storing a computing-device management program for causing a computer to execute steps comprising:

calculating a load prediction value, which is a value of a future load in each computing device among computing devices, based on load information of a computing device informed by the computing device and determining whether the load prediction value exceeds a predetermined threshold value;

detecting, a computing device as a target computing device that is to be in an overloaded state at a future time, the target computing device determined to have the load prediction value exceeding the predetermined threshold value by determining whether the load prediction value exceeds the predetermined threshold value, and determining which computing device is to be an allocation-destination computing device for operating of at least one software component operating in the target computing device based on a CPU load, a used memory volume, and a data communication volume of the computing device;

informing the target computing device and the allocation-destination computing device of information of the allocated software component, based on the detection of the overload state of the target computing device and the determination of the allocation-destination computer device;

calculating a transfer score for each of the software components based on:

1) a CPU load, a memory load, and a data communication volume of the software component operating on the target computing device; 2) predetermined weight factors for the CPU load, the memory load, and the data communication volume; and 3) a transfer priority set for each of the software components; and prioritizing allocation of a software component having a large score as the transfer score to another computing device.

* * * * *